Figure 1:
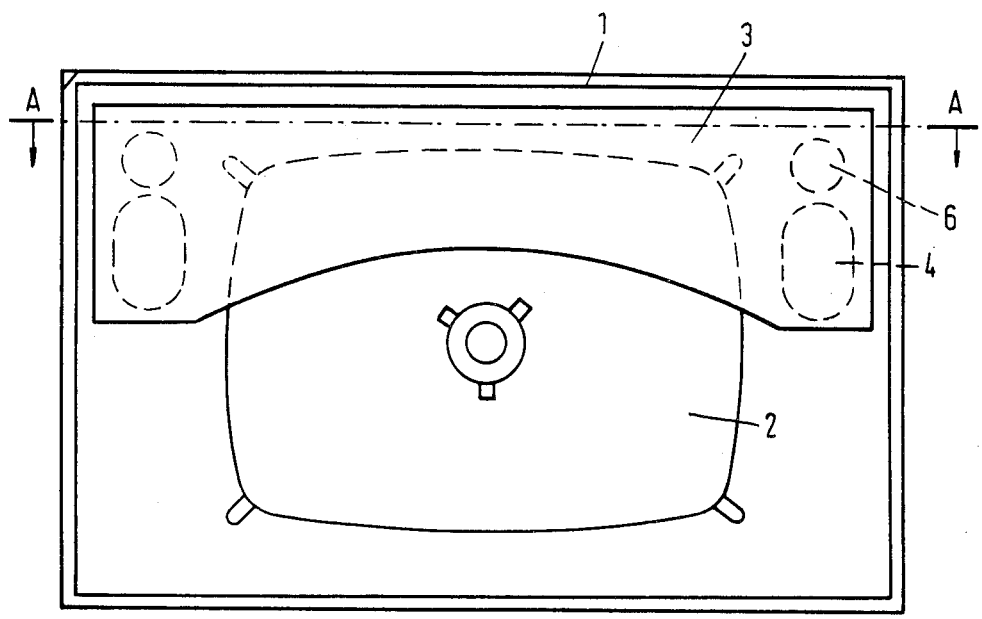

United States Patent [19]

Puls

[11] Patent Number: 4,646,349

[45] Date of Patent: Feb. 24, 1987

[54] EQUIPMENT FOR THE STEREOPHONIC SOUND REPRODUCTION IN A TELEVISION RECEIVER

[75] Inventor: Bernhard Puls, Mitterfels, Fed. Rep.

[73] Assignee: Standard Elektrick Lorens Aktiengesellschoft, Stuttgard, Fed. Rep. of Germany

[21] Appl. No.: 700,378

[22] Filed: Feb. 11, 1985

[30] Foreign Application Priority Data

Feb. 14, 1984 [DE] Fed. Rep. of Germany ....... 3405128

[51] Int. Cl.⁴ .............................................. H04R 5/00
[52] U.S. Cl. ...................................... 381/24; 381/90; 358/254; 181/153
[58] Field of Search ................. 358/254, 189; 381/24, 381/87, 88, 90, 99; 181/153; 179/146 E

[56] References Cited

U.S. PATENT DOCUMENTS 2,789,158  4/1957  Livingston ........................... 358/254
3,086,078  4/1963  Sharma ................................ 358/254
3,970,782  7/1976  Fenne .................................. 358/254

FOREIGN PATENT DOCUMENTS 533333   4/1958   Belgium .............................. 358/254
3317518  11/1984  Fed. Rep. of Germany .
2310665  12/1976  France ................................. 358/254
545143   6/1956   Italy .................................... 358/254
2102243  1/1983   United Kingdom .................. 381/24
388373   10/1973  U.S.S.R. ............................... 381/24

Primary Examiner—Forester W. Isen
Attorney, Agent, or Firm—John T. O'Halloran; Thomas F. Meagher

[57] ABSTRACT

In the novel equipment for the stereophonic sound reproduction in the television receiver all essential components, such as loudspeakers, crossover networks, etc., are accommodated in one single enclosure which fits into the space above the picture tube, in which it is mounted.

3 Claims, 4 Drawing Figures

EQUIPMENT FOR THE STEREOPHONIC SOUND REPRODUCTION IN A TELEVISION RECEIVER

The invention relates to an equipment for the stereophonic sound reproduction in a television receiver comprising a closed loudspeaker enclosure unit disposed inside the television receiver cabinet.

One such equipment is known (German Pat. No. 31 28 462). This conventional equipment is a closed loudspeaker enclosure unit which is capable of being attached in such a way to the side members inside a television receiver cabinet, that the diaphragm of the woofer chassis disposed in it, radiates toward the side, and which comprises a port opening which is respectively in connection with a port opening provided for in the front part of the cabinet.

This conventional equipment has already been used to a larger extent and has also proved well in practice. In the first place, however, it shows to have the disadvantage that each time two pieces are required in manufacturing a television receiver equipped for the stereophonic sound reproduction with this, on the one hand, involving a higher investment in material and, on the other hand, higher assembly costs. Moreover, it is considered a disadvantage that the conventional equipment, by having same dimensions, owing to the different size and arrangement of the electronic receiving circuits in the different types of receivers of the same manufacturer or of different manufacturers is only capable of being used with one or a few types of receivers. The same equipment can only be used with other receivers by having different dimensions.

It is the object of the invention, therefore, to provide an equipment for the sound reproduction in a television receiver which is suitable for being used with a larger number of types of different receivers, and is capable of being mounted or assembled in a simple way.

According to the invention, this object is achieved in that at least the loudspeakers required for reproducing the low frequency band, as well as the frequency crossover networks are accommodated in a single elongated, parallelepiped box-shaped enclosure which, if necessary, is adapted to the shape of the cone of the picture tube, with this enclosure capable of being mounted in position above the picture tube in the upper half of the television receiver cabinet.

The novel equipment is so designed as to be accommodated inside the television receiver cabinet in the space above the picture tube which remains unused with most types of television receivers. In this way, it should be sufficient to manufacture an equipment fitting every type of picture tube. This is particularly economical because the number of employed types of picture tubes is relatively small. Moreover, the novel equipment can be easily mounted in position in a cost-effective manner.

Figure 2:
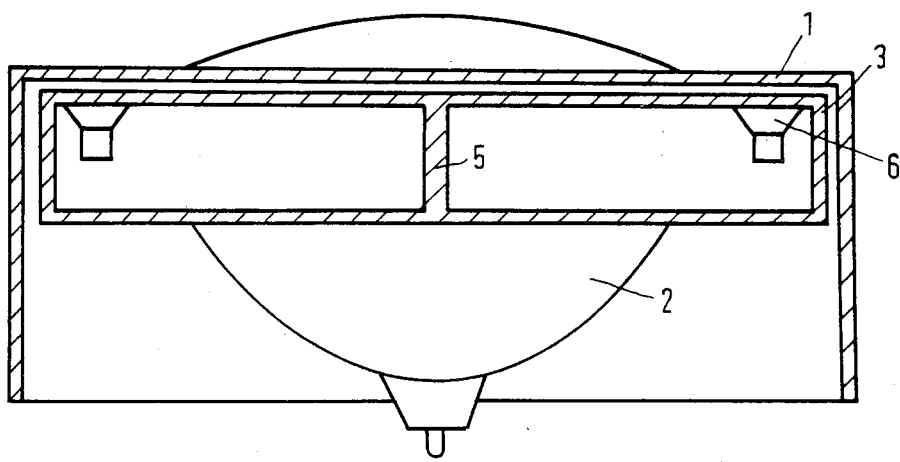
Figure 3:
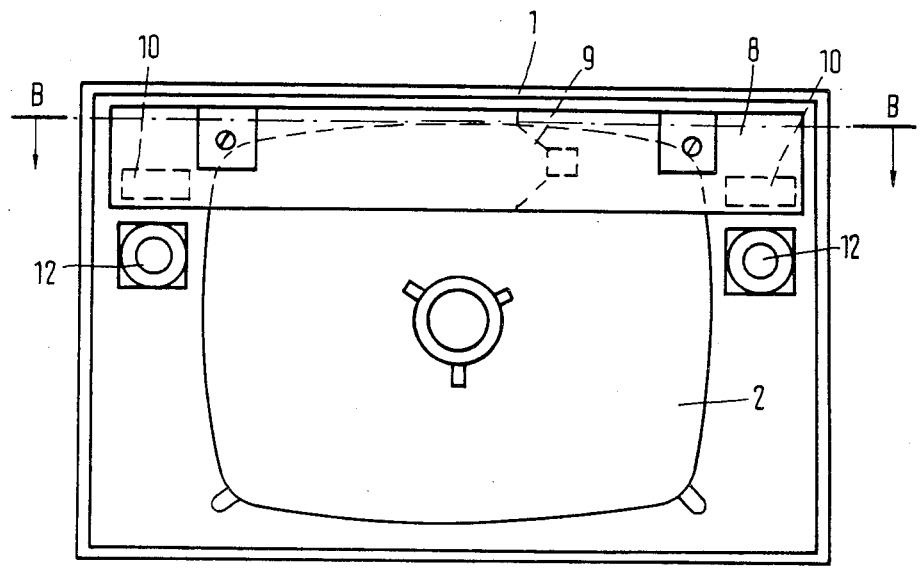
Figure 4:
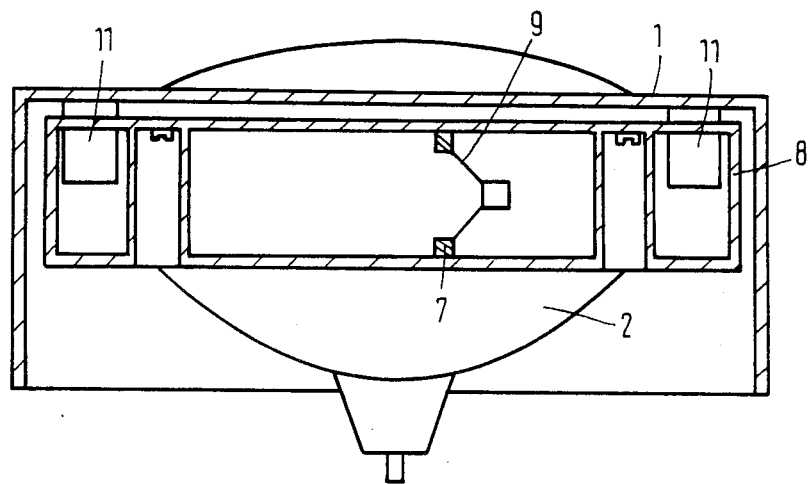

Advantageous embodiments of the invention are set forth in claims 2 and 3. In the following, the invention will now be explained in greater detail with reference to examples of embodiment shown in FIGS. 1 to 4 of the accompanying drawings, in which:

FIG. 1 is the top view onto the open rearside of a telelevision receiver in which one type of embodiment of the equipment according to the invention is disposed, FIG. 2 is the section taken on line A—A through the television receiver as shown in FIG. 1, FIG. 3 is the top view onto the open rearside of a television receiver in which a modified type of embodiment of the equipment according to the invention is disposed, and FIG. 4 is a section taken on line B—B through the television receiver as shown in FIG. 3.

FIG. 1 permits to recognize the television receiver cabinet 1 inside which the picture tube 2 is mounted. The box-shaped enclosure 3 is mounted above the picture tube 2. From FIG. 2 it can be seen that the enclosure 3 is divided by the partition wall 5 into two equal volumes and comprises in its side facing the front side of the elevation receiver, that is, in the present example of embodiment, each time one tweeter 6 and one midrange woofer 4. Appropriately, the enclosure also contains the—not shown—crossover networks. In the example of embodiment as shown in FIGS. 1 and 2, the box-shaped enclosure 3 is so designed that two speaker enclosures which are closed on all sides, are united to form a one-piece body. However, with respect to the invention it is not essential what kind of speaker enclosure results, but that the enclosure is so designed as to be disposed in the space above the picture tube 2.

In the example of embodiment as shown in FIGS. 3 and 4, the box-shaped enclosure 8 is substantially flatter than the one shown at 3 in FIGS. 1 and 2. In this example of embodiment, the enclosure 8 is only supposed to contain the means required for radiating the low frequencies. For this purpose, there is provided on the one hand, the woofer 9 in the partition wall 7. The woofer may also be a loudspeaker comprising two voice coils, or else also two loudspeakers may be mounted in the partition wall 7 to which the low-frequency signals of the two stereo channels are fed. On the other hand, the side of the enclosure 8 facing the front side of the television receiver is provided on the right and/or on the left with the port opening 10 (FIG. 3). In these port openings 10 there are disposed the respective duct tubes 11 (FIG. 4) of which each represents a connection between the volume in the enclosure 8 and the volume outside the television receiver cabinet 1. The mode of operation of this arrangement is described in the German Published Patent Application (DE-OS) No. 33 17 518. In this particular example of embodiment, separate loudspeakers 12 are provided for reproducing the high and medium frequencies.

What is claimed is:

1. A stereophonic sound reproduction system for use in a television receiver,
    said television receiver comprising a cabinet containing a picture tube having an arcuate portion, said system comprising:
    at least a loudspeaker for reproducing a low frequency band;
    a crossover network connected to said loudspeaker;
    a unitary, elongated enclosure containing said loudspeaker and said crossover network, said enclosure formed so that when installed in said cabinet, it straddles and conforms to said arcuate portion of said picture tube.

2. A system as claimed in claim 1, further comprising means dividing said enclosure in to two equal volumes.

3. A system as claimed in claim 1, further comprising a partition wall dividing said enclosure into two unequal volumes, said wall having mounted therein at least one woofer chassis, and at least one of said unequal volumes is connected to ambient atmosphere via a port opening and a duct tube.

* * * * *